US009916365B1

(12) United States Patent
Dick et al.

(10) Patent No.: US 9,916,365 B1
(45) Date of Patent: Mar. 13, 2018

(54) CITATION NETWORK ANALYTICS

(71) Applicant: THOMSON REUTERS GLOBAL RESOURCES, Baar (CH)

(72) Inventors: Terry S. Dick, Zug (CH); Jonathan J. Medin, Oberwil bei Zug (CH); Michael J. Krause, Walchwil (CH); Daniel Bennett, Rosemount, MN (US); Jason Rollins, San Francisco, CA (US); Mathilda Edmunds, Philadelphia, PA (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 299 days.

(21) Appl. No.: 14/567,642

(22) Filed: Dec. 11, 2014

(51) Int. Cl.
    *G06F 17/30* (2006.01)

(52) U.S. Cl.
    CPC .... *G06F 17/3053* (2013.01); *G06F 17/30882* (2013.01)

(58) Field of Classification Search
    USPC .......... 707/748, 726; 715/206, 231
    See application file for complete search history.

(56) References Cited

U.S. PATENT DOCUMENTS 8,656,266 B2 * 2/2014 Cierniak ............ G06F 17/2235
                                                    707/726
2007/0130100 A1 * 6/2007 Miller ............... G06F 17/30014

* cited by examiner

*Primary Examiner* — Hung T Vy

(57) ABSTRACT

The present disclosure is directed towards systems and methods for linking documents that refer to other documents through implicit linkages. A first document is identified. The first document comprises an authoritative comment regarding a second document and has been explicitly linked to the second document. Then, one or more third documents are identified. The second document cites or is being cited by the one or more third documents and shares common information. Based upon the authoritative comment, the first document is implicitly linked to the one or more third documents via the common information.

13 Claims, 7 Drawing Sheets

CITATION NETWORK ANALYTICS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright© 2014 Thomson Reuters.

TECHNICAL FIELD

This disclosure relates generally to citations and citation networks. More specifically, the disclosure is directed towards systems and methods for linking documents that refer to other documents through implicit linkages.

BACKGROUND

Citations are references to published or unpublished documents or sources in science, law, or other fields to identify or refer to documents, articles, books, legislation, court opinions, patents, legal filings, etc.

There are various citation index products available today. However, the citation index networks analyzed by these products are limited to explicit citation linkages between documents—cited and citing. Certain citation linkages are clear, e.g. Case A cites Case B which cites Case C. What is less clear, but of possible equal importance, is where Case A somehow impacts Case C but the impact is latent and only visible through an investigation of the facets discussed that are common between A and C. In such situations, the authority of Case C may have been subject to an influencing judgment that increases or decreases the authority of Case A. Current index products do not show this connection. Today, users are required to perform their own lengthy research to identify whether or not factual and legal issues have been damaged by an implicit citation linkage that exists outside of the explicit citing cited change of documents.

Generally, there is a lack of a comprehensive and systematic identification and linking of implicit citations through a multi-generational, multi-node citation network.

Accordingly, there exists a need for methods and systems that expand the citation network analysis beyond explicit references. Such methods and systems would improve research efficiency through citation analysis by including both implicit references as well as deeper analysis of citation network indicators of significance.

SUMMARY

The present disclosure is directed towards systems and methods for linking documents that refer to other common documents through implicit linkages.

In one aspect, the method includes identifying a first document. The first document comprises an authoritative comment about or regarding to a second document. Then at least a third document is identified. The second document citing or being cited by the third document and shares common information, such as metadata or shared metadata. Based upon the authoritative comment, the first document is linked to the third document via the common information or facet(s).

According to one embodiment, an implicit relationship between the first document and the third document is detected. For that the common relationship between the second document and the third document is used.

According to another embodiment, the implicit relationship is compared to an explicit relationship and an impact value or score is generated. The impact value or score is indicative to an implicit relationship between the first document and the third document.

According to yet another embodiment, the linking is updated when document changes occur, but also when a new document is added.

The linkage and the impact value can be used to display implicit relationships between documents. This will provide researchers with additional insights into the validity of documents that are not explicitly connected via a citing cited relationship. In the situation of legal research the present disclosure provides increased support for legal practitioners to base their decisions on. It will save researchers time not to search through extensive documents and information that may have invalidated a document. In the situation of scientific research the present disclosure provides the capability of researchers to be warned if a study has been invalidated due to questionable peer review networking i.e., citation stacking. It also provides a means for cascading the information when a study has been retracted and provide visibility to researchers that may have relied on the retracted research.

For professionals, confidence in the authority of cited information is essential for quality complete work. This disclosure generally increases the ability to decipher information that is difficult to decipher based on explicit citing cited relationships of documents and goes beyond explicit citing cited combinations to find implicit relationships in the citation networks.

A system, as well as articles that include a machine-readable medium storing machine-readable program code for implementing the various techniques, are disclosed. Details of various embodiments are discussed in greater detail below.

Additional features and advantages will be readily apparent from the following detailed description, the accompanying drawings and the claims.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

Various terms used in this disclosure are considered interchangeable, such as explicit linkages, also referred to as explicit references, explicit relationships, explicit citing relationships, or explicit citing linkages. Implicit linkages are also referred to as implicit references, implicit relationships, implicit citing relationships, implicit citing linkages, or inferred linkages. Common information used to derive implicit linkages relates to metadata, common and/or shared metadata, or shared facets. A semantic analysis is one method of determining common metadata or facets. Further, common sentiment, sentiment, or impact sentiment may be used to help derive common metadata or facets. A sentiment is either positive, negative, or neutral. So shared sentiment is, for example, when both statements are "positive". The implicit linkages are based on common information, common sentiment, or impact sentiment. Documents that are implicitly linked share a common relationship. The common relationship is derived by common metadata or shared facets. An authoritative comment is also called authoritative judgment or influencing judgment. A document having a citation relationship cites or is being cited. This is also referred to as citing cited relationship or cited citing relationship.

Figure 1:
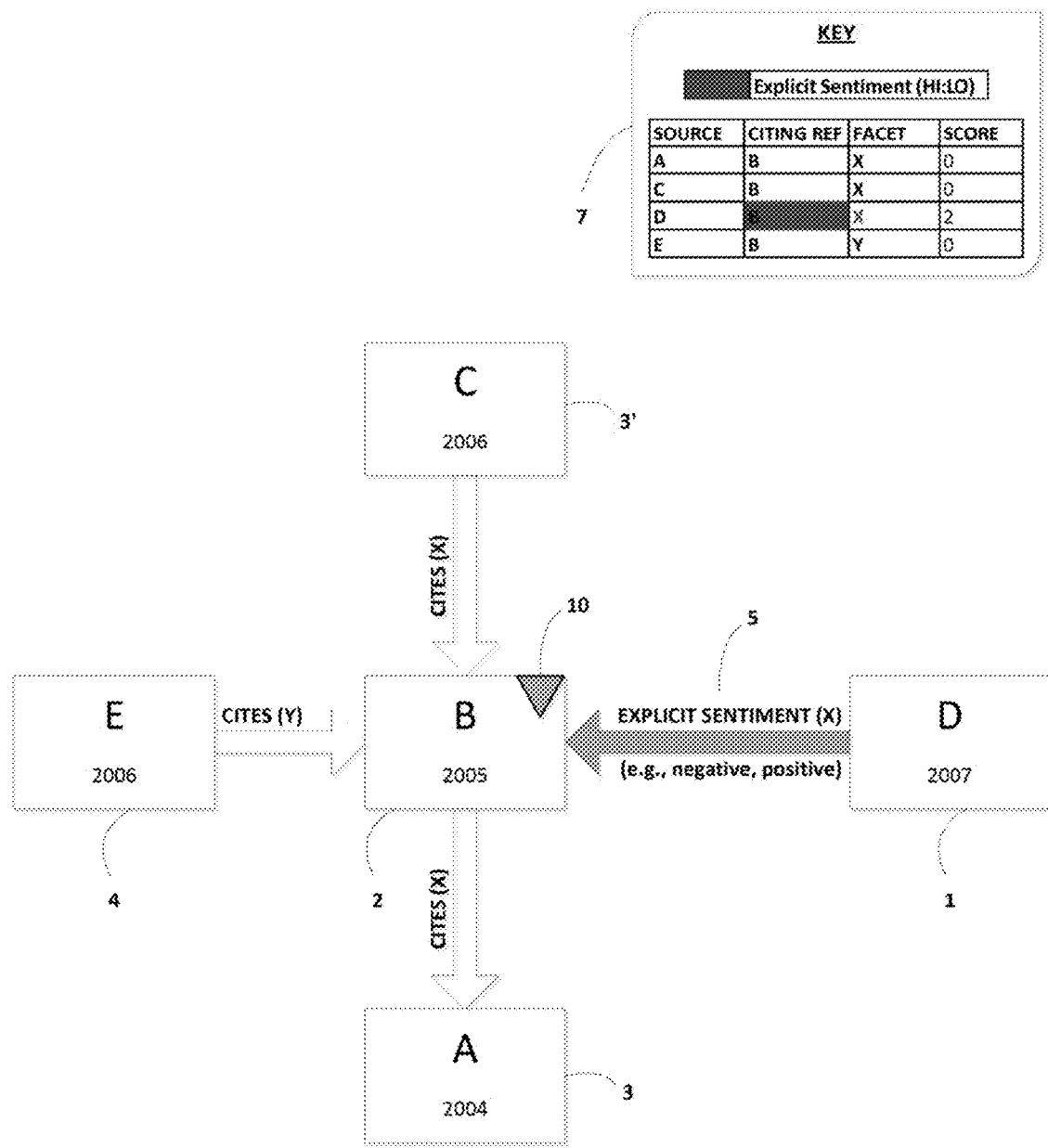
FIG. 1 is a schematic depicting documents with citations having an explicit link.

Turning now to FIG. 1 that shows various sources or documents labeled with A, B, C, D and E. In the example, a first document 1, also referred to as D document, was published in 2007. A second document 2, also referred to as B document, was published in 2005. The B document cites and is cited by a third document 3, 3', also referred to as A and C document. The A document is here the oldest one from 2004 and is cited by the B document. The B document itself is cited by the C document. A fourth document 4, also referred to as E document, from 2006 also cites the B document.

Generally, the D document, the first document 1, has an authoritative comment on the B document, the second document 2. The comment might have a negative (e.g. abrogate, retract) or positive impact. This is depicted by an explicit sentiment 5. The fact that the B document is impacted is indicated by a flag 10 or any other suitable indicator.

A key or sentiment table 7 indicates the sources or documents A, B, C, D, E with the respecting citing references, the same (X) or different (Y) facets, and a resulting score. Here the score 2 indicates the explicit relationship between the first document 1 and the second document 2. A score of 0 can be understood as having no or limited influence on the relationship between the documents. It is noted that the A, B, and C documents reference the same facet (X) as the D document, whereas the E document references a different facet (Y) than the D document.

Figure 2:
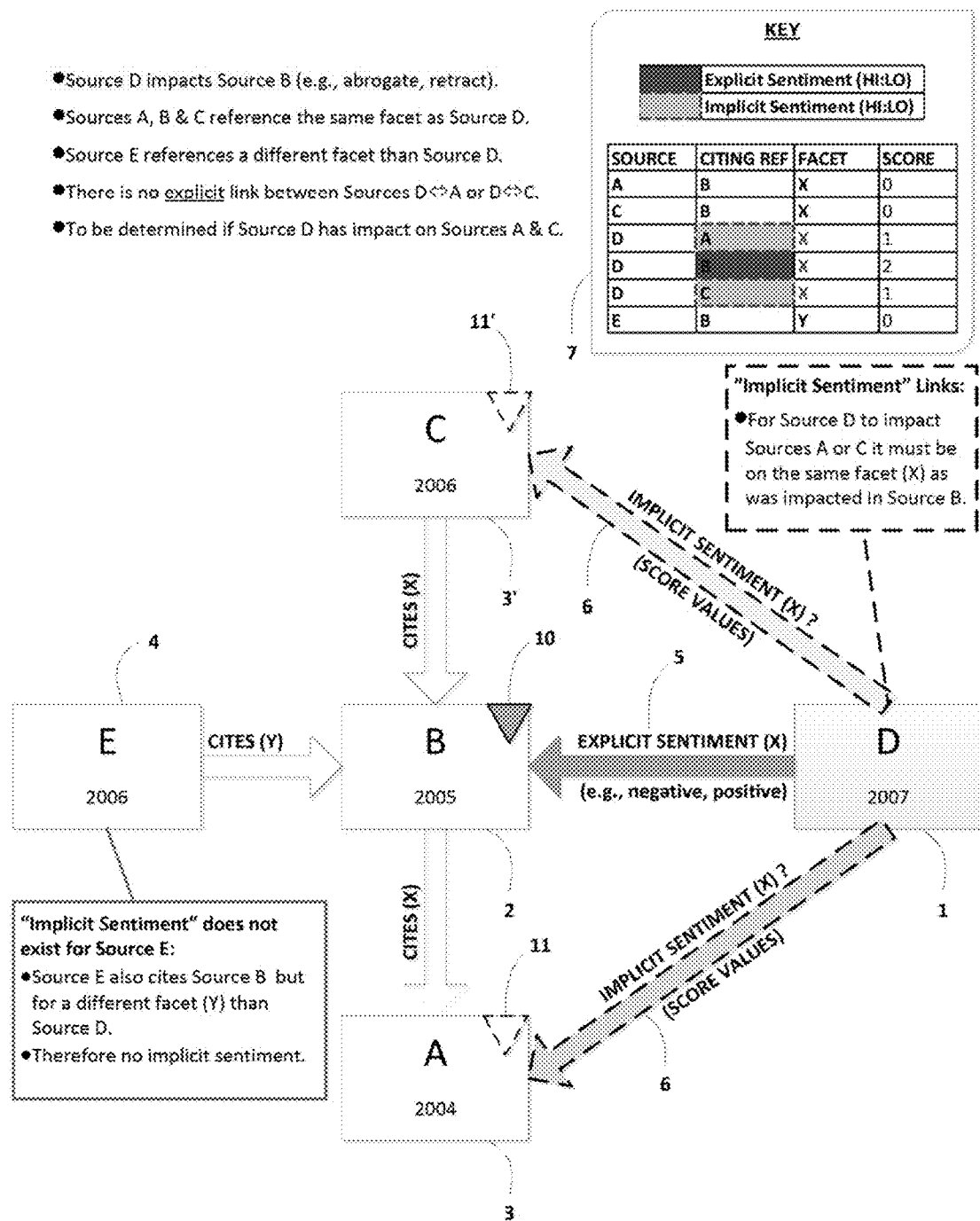
FIG. 2 is a schematic depicting documents with explicit and implicit citation linkages.

Turning now to FIG. 2, where explicit and implicit citation linkages are established. FIG. 2 shows the various sources or documents labeled with A, B, C, D and E as described and shown in FIG. 1. Through the authoritative comment, e.g. mentioning in the D document the B document, an explicit relationship and thus an explicit linkage between the D document and the B document is established. The authoritative comment can be derived directly, editorially, or technically from the source material.

There is no explicit linkage between the D and A document and the D and C document, but there are citing cited relationships between the B document and the A document and between the C document and the B document. However, the D document has a certain impact on the A and C document. This is indicated by an implicit sentiment 6 that is derived from an impact value, also referred to as score or score value in the key table 7. The impact value can be derived in various ways. A flag indicator 11, 11' indicates the implicit relationship between the D and A document and the D and C document. However, the implicit linkage does not exist for the E document. The E document cites the B document, but for a different facet (Y) than the D document. Therefore there is no implicit linkage. On the other hand, for the D document to impact the A or C document it should be on the same facet (X) as what impacted the B document.

The key or sentiment table 7 shows the explicit and implicit sentiments for the A, B, C, D, E documents with the respecting citing references, the same (X) or different (Y) facets, and the resulting scores 0, 1, or 2. The sentiment table 7 indicates the explicit and implicit sentiments with high (HI) and low (LO). Again, a score of 2 indicates the explicit relationship between the first document 1 and the second document 2. The score 0 has no or limited influence on the relationship between the documents. A score of 1 however refers to an implicit sentiment as indicated by the implicit sentiment 6. The fact that there is an implicit linkage between documents is indicated by the flag indicator 11, 11' or any other suitable indicator.

Figure 3:
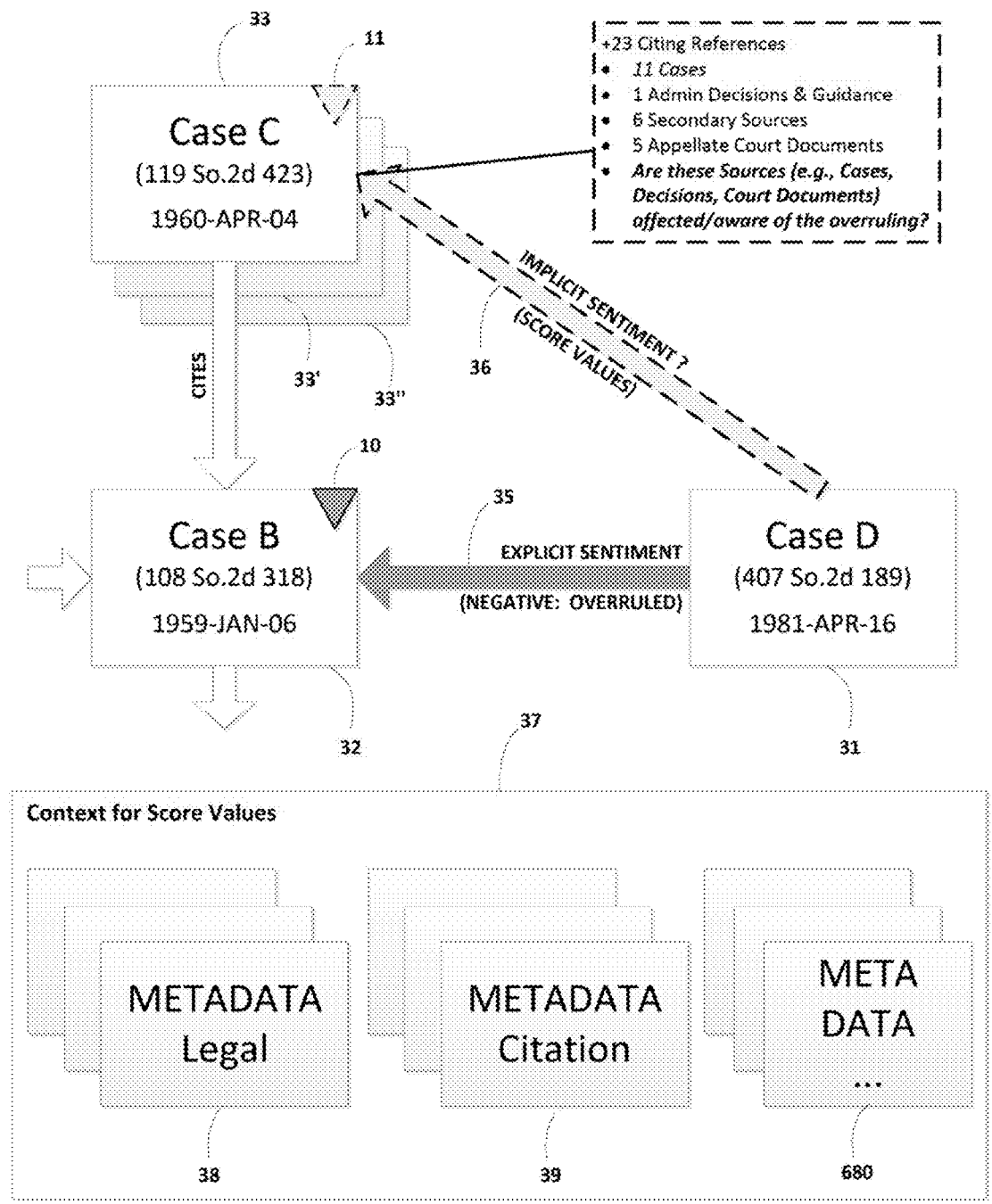
FIG. 3 is an illustration of an embodiment in the legal field where a case is overruled and further cases might be impacted.

FIG. 3 depicts an embodiment in the legal field where a first case 31, also referred to as Case D, overrules a second case 32, also referred to as Case B. Case B is cited by a third case 33, also referred to as Case C, or multiple cases 33', 33" as indicated in the figure.

Figure 5:
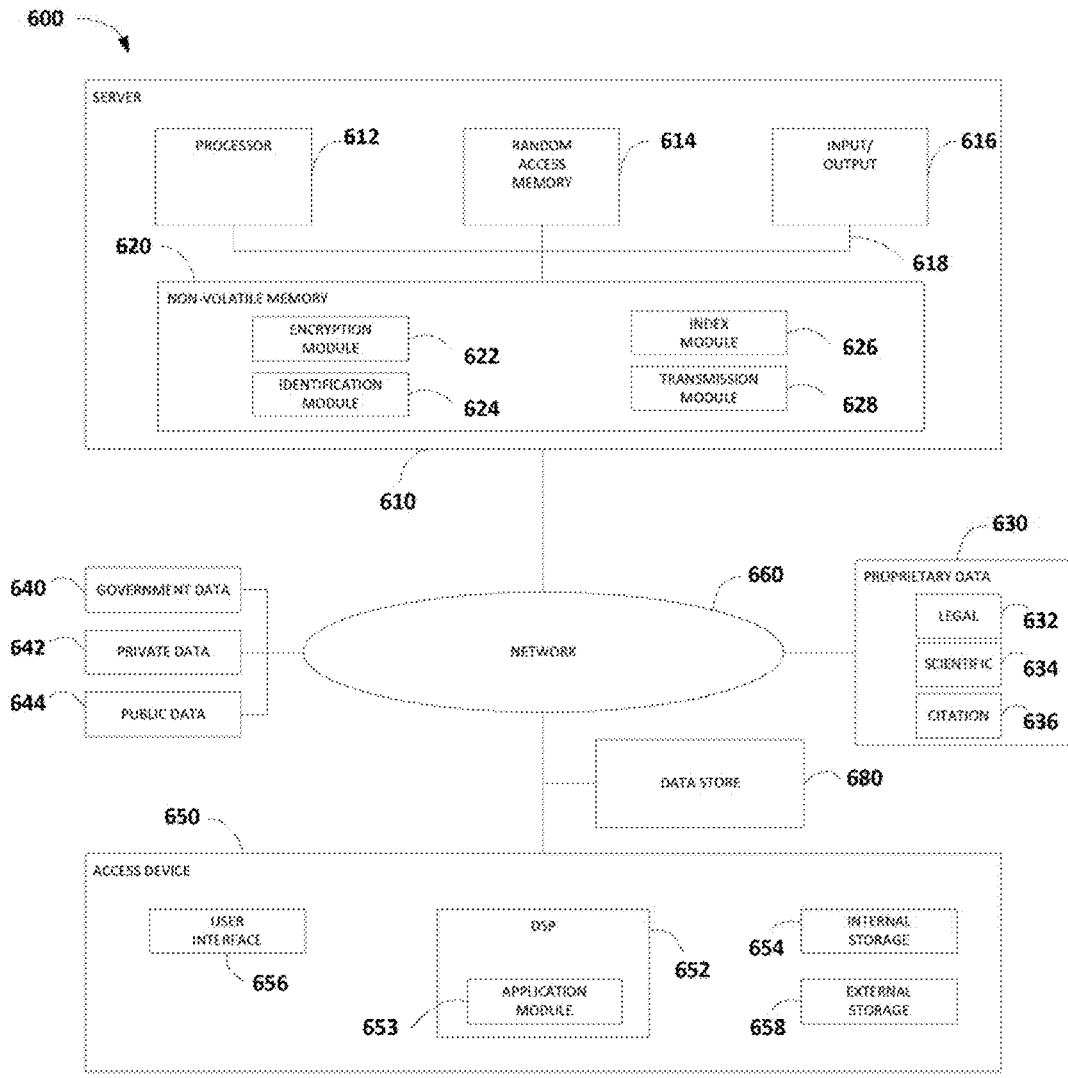
FIG. 5 is a schematic depicting an exemplary computer-based system for linking documents that refer to other documents through implicit linkages.
Figure 6:
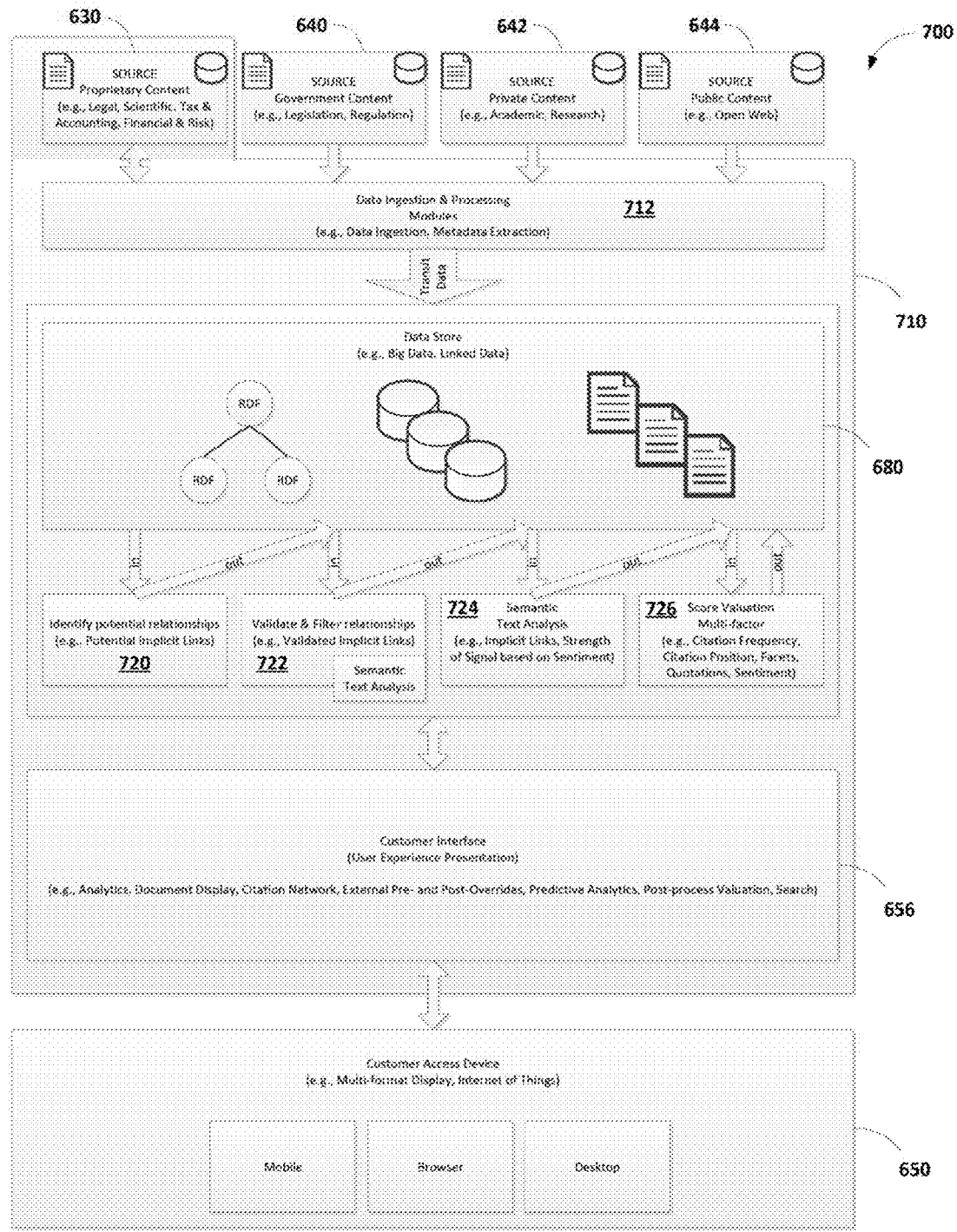
FIG. 6 is a further schematic depicting an exemplary computer-based infrastructure for linking documents that refer to other documents through implicit linkages.

Case D "407 So.2d 189" from April 1981 overrules Case B "108 So.2d 318" from 1959 through a negative authoritative comment that creates an explicit sentiment 35 or linkage. This fact is indicated for Case B with the flag 10. Case C "119 So.2d 423" from 1960 and other cases 33', 33" might also be affected, but might not be aware of the overruling. Thus, score or impact values are derived from various data sources 37. A legal database 38 and a citation database 39 with metadata, but also further metadata, like a data store 680 as shown in FIGS. 5 and 6, can be used to derive the values. These values are used to identify an implicit linkage 36 between the first case 31, Case D, and the third case 33, 33', 33" with Case C. Flag 11 or any other suitable indicator can indicate the implicit linkage. The indicator can be a colored flag or a kind of meter that shows the degree of impact, e.g. low or high or anything between.

The implicit linkage is relevant for legal research and legal practitioners to save time and conclude on proper decisions or otherwise risk committing malpractice by missing "hidden" information. An example is when a court says "we overturn case Z and its progeny". Sometimes courts are clear with their intent to identify the fact that there are cases that they are affecting without specifically mentioning them by citation through the use of the term "progeny" but, which is probably more often the case, they affect other cases simply by implication of the ruling on a specific facet which is the situation in the case as mentioned. Both examples will be identified by this disclosure. If a researcher starts their research based on one of the progeny that is not explicitly cited by the court decision it appears to be valid devoid of any warning signal. An example of this situation can be found in "119 So.2d 423" as mentioned. Generally, it looks valid but for the point found in "108 So.2d 318" which it relied upon it is no longer valid. It is no longer valid because "108 So.2d 318" was overruled by "407 So.2d 189" based on the same facet (X).

A further embodiment for legal document determination is described in the following. Like documents will be determined by evaluating if there are common cited citing relationships between documents that have been identified as containing negative metadata relationships. Once the groupings of documents that have common cited citing relationships are determined, a filtering process will be applied to see if they discuss common facets. This can be performed by using a lookup of the metadata for every potential document in the common cited citing grouping. A potential example of this is described with the following steps:

1) In the instance of court cases the process would involve finding cases that have negative history in proprietary data and then taking the case that is affected negatively and retrieving its permanent id to be used by step 2.

2) Take the id from step 1 and get a listing of all cases it has cited or have cited it from a citation database, e.g. KeyCite. Take all the document id numbers and group them for process in step 3.

3) Determine if the cited or citing cases have a direct history marker.

4) Cases that do not have a negative marker already identified would proceed to see if they share a topic identified by a specific common Key Number (a taxonomic hierarchy applied to case law by editors) assigned to the relationship in the citation database. This is a two step process. Step 1 is to look at the citation database to see what headnote assignments were made by the original negative citing document. Step 2 is to take the headnote placement identified in the citing document of the cited document and look up the corresponding Key Number.

5) Once the key legal issues and thus the Key Numbers are also identified the information can be compared to the entire cited citing pool that was identified in step 2. If there are common Key Numbers involved in the related cases the grouping of the cases can be passed on to a programmatic processing algorithm and semantic analysis. The semantic word comparison will be added to the information gathered by the original analysis to determine based on belief score which documents likely contain similar weaknesses identified in the original determination of negativity in step 1.

In practice a big data approach should be used to compute the candidate set of invalidated documents for the entire corpus in a single pass. In this instance, it may well be the case that a candidate document is found invalidated on the basis of more than one point of law and thus will want to score this more highly.

A big data approach will broadly require the following operations. For the purposes of simplicity, all cases are assumed to have the same 'value', e.g. no court hierarchy.

Textual_feature(headnote)→returns a complex vector describing the text of a headnote Negative_flag( )→returns the set of caselaw currently negatively flagged (documents)

Citing(document)→returns the set of citing documents for a case (documents)

Key_numbers(document)→returns the Key Numbers assigned to a document (keynumbers)

Headnotes(document)→returns the headnote text assigned to a document (headnotes)

Similarity(textual_feature1, textual_feature2)→returns a similarity metric for two textual feature vectors Using these functions a fact-table for all caselaw documents is created.

Document_id, key_numbers[ ], headnote_feature_vectors[ ]

A second table provides all the cases with negative history.

Document_id, negative_headnote_vectors, negative_key_numbers

From these two tables, a join should provide the candidate set of potentially negative cases for each source document with the similarity function used to truncate below a certain threshold.

A subsequent query could be used to find documents that have potential invalidity due to more than one case.

Figure 4:
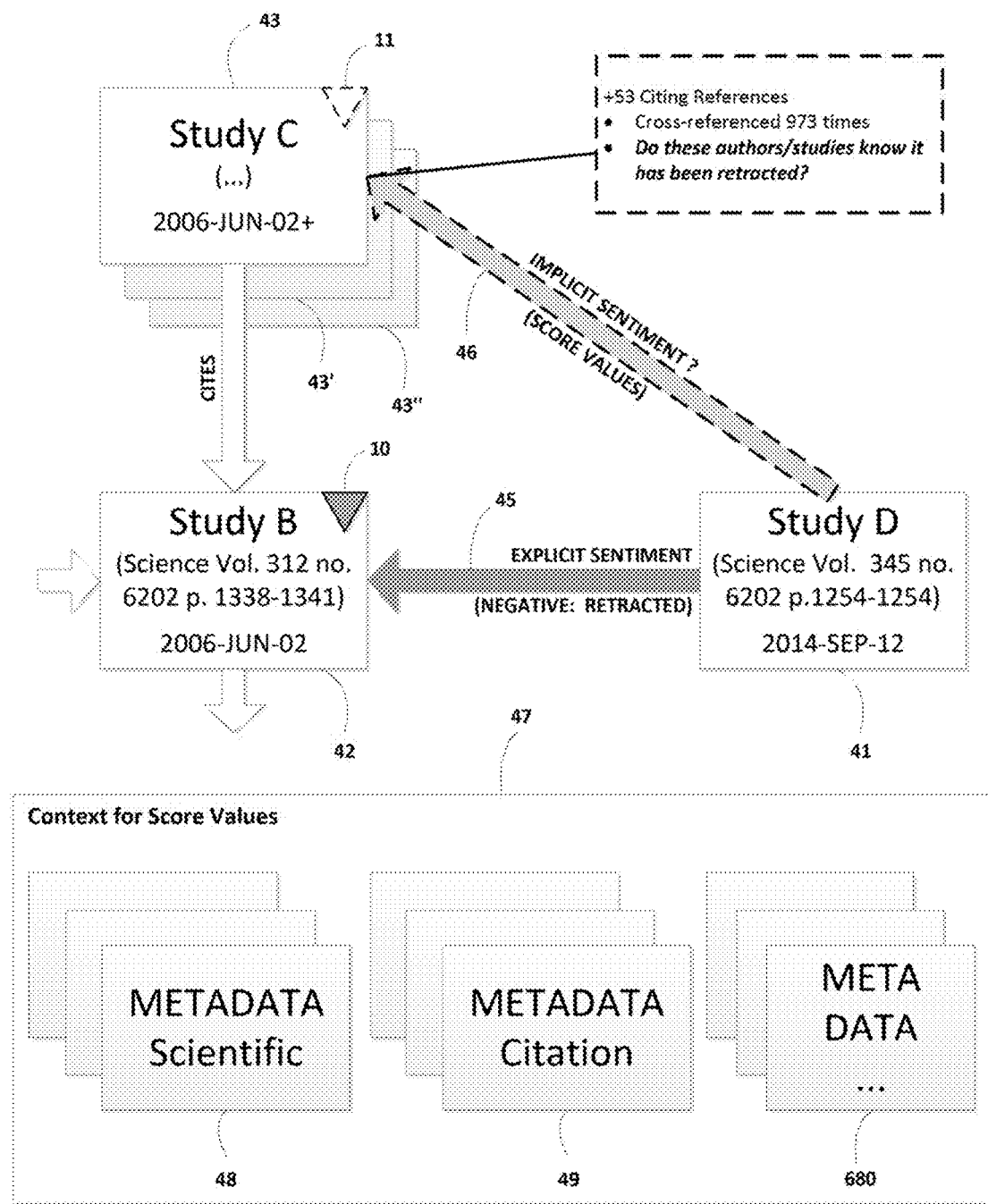
FIG. 4 is an illustration of a further embodiment in the field of science where a study is retracted and this has an impact on other studies.

FIG. 4 shows an embodiment in the science field where a first study 41, also referred to as Study D, is retracted and impacts a second study 42, also referred to as Study B, but also implicitly impacts a third study 43, also referred to as Study C, and further studies 43', 43", as indicated in the figure.

Study D published in Science in September 2014 retracted Study B published in Science in June 2006. This has an explicit sentiment 45 that is negative on Study B, as Study B is retracted by Study D. This fact is indicated for Study B with the flag 10. As indicated, Study C and further studies 43', 43" might also be affected, but might not be aware of the retraction. Thus, score or impact values are derived from various data sources 47. A scientific database 48 and a citation database 49 with metadata, but also further metadata, like in data store 680 as shown in FIGS. 5 and 6, can be used to derive the values. These values are used to identify an implicit sentiment 46 between the first study 41, Study D, and the third studies 43, 43', 43" with Study C. Flag 11, or any other suitable indicator, indicates the implicit linkage.

The described embodiment applies to scientists reviewing a citation network of published research articles but the approach could be extended to cases involving patent-related or other documents as well.

With a rigorous exploitation of both the explicit and implicit links in the document citation network reflected in large-scale citation indexing systems, the systems can help researchers and professionals save time and conclude with proper decisions.

While explicit signals are often captured, published retractions of some articles, for example, are not universally accounted for nor do they flow through the network in a reliable way.

Explicit negative citation signals are captured, codify as programmatic actions and/or metadata, and enable these signals to be universally accessible and actionable within large-scale citation indexing systems. A further approach includes monitoring emerging patterns that could help trigger early warning alerts of purposeful and fraudulent manipulation of authority within such networks.

Turning now to FIG. 5, an example of a suitable computing system 600 within which embodiments of the disclosure may be implemented is presented. The computing system 600 is only one example and is not intended to suggest any limitation as to the scope of use or functionality of the disclosure. Neither should the computing system 600 be interpreted as having any dependency or requirement relating to any one or combination of illustrated components.

For example, the present disclosure is operational with numerous other general purpose or special purpose computing electronics, network PCs, minicomputers, servers, mainframe computers, laptop computers, as well as distributed computing environments that include any of the systems or devices, and the like.

The disclosure may be described in the general context of computer-executable instructions, such as program modules, being executed by a computer. Generally, program modules include routines, programs, objects, components, data structures, loop code segments and constructs, etc. that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 5, the system 600 includes a server 610 configured to include a processor 612, such as a central processing unit ("CPU"), random access memory ("RAM") 614, one or more input/output devices 616, such as a display device (not shown) and keyboard (not shown) and non-volatile memory 620, all of which are interconnected via a common bus 618 and controlled by the processor 612.

As shown in the FIG. 5 example, in one embodiment, the non-volatile memory 620 is configured to include an encryption module 622, an identification module 624, an index module 626 and a transmission module 628. The identification module 624 is configured to analyze one or more content items that are maintained in a first data store 630, also referred to as data store 630. The server 610 is configured to analyze and process data maintained in the first data store 630 and a second data store 680. The encryption module 622 is configured to encrypt each content item. The encryption module 622 employs encryption techniques as are known in the art, such as Advanced Encryption Standard (AES) 128 bit, 192 bit and 256 bit encryption specifications, and can employ portions or the entirety of the content items. The transmission module 628 is configured to transmit a plurality of content items.

Further, a network 660 is provided that can include various devices such as routers, server, and switching elements connected in an Intranet, Extranet or Internet configuration. In one embodiment, the network 660 employs one or more wireless communication protocols to transfer information between an access device 650, the server device 610, the data stores 630, 680 and data sources 640, 642, 644. The data sources provide government data 640, private data 642, and public data 644. The government data 640 relates to legislative content, such as bills, laws, regulations, rules, statutes, acts and ordinances. The private data 642 and public data 644 relate to miscellaneous content, such as but not limited to notifications, press notes, orders, legal notices, circulars and trade notices, along with a respective index.

For example, the network 660 may be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 660 may also be a Wide Area Network (WAN), such as the Internet, which employs one or more transmission protocols, e.g. TCP/IP. As another example, the network 660 may employ a combination of digital cellular standards and transmission protocols. In another embodiment, the network 660 uses wired communications to transfer information between the access device 650, the server 610, the data stores 630, 680 and the data sources 640, 642, 644. In yet other embodiments, the network 660 employs a combination of wired and wireless technologies to transfer information between the access device 650, the server device 610, the data stores 630, 680 and the data source 640, 642, 644.

The data store 630 is here a repository that maintains and stores information utilized by the before-mentioned modules 37, 47. In one embodiment, the data store 630 is an area of non-volatile memory 620 of the server 610.

In one further embodiment, as shown in the FIG. 5 example, the data store 630 is a repository that includes a legal database 632, 38 with legal content, a scientific database 634, 48 with science content, and a citation database 636, 39, 49 with citation content, but it could comprise also further content, e.g. relating to tax, accounting or patents. The content of the databases 632, 634, 636 can be encrypted through the encryption module 622.

In one embodiment, the data store 630 is a relational database, such as Microsoft SQL Server. In another embodiment, the data store 630 is a directory server, such as a Lightweight Directory Access Protocol ("LDAP").

Although the data stores 630, 680 and the data sources 640, 642, 644 shown in FIG. 5 are connected to the network 660, it will be appreciated by one skilled in the art that the data stores 630, 680 and the data sources 640, 642, 644 and/or any of the information shown therein, can be distributed across various servers and be accessible to the server 610 over the network 660, be coupled directly to the server 610, or be configured in an area of non-volatile memory 620 of the server 610.

The access device 650, according to one embodiment, is a mobile device having a user interface 656, a digital signal processor 652 with an application module 653, an internal storage component 654, an external storage component 658, a power management system (not shown), an audio component (not shown), audio input/output components (not shown), an image capture and process system (not shown), RF antenna (not shown) and a subscriber identification module (SIM). The internal storage component 654 may include, for example, static random-access memory (SRAM) or Flash memory components. The external storage component 658 may include, for example, a peripheral storage device external to the access device 650, such as an external Secure Digital (SD) memory card. According to another embodiment, the access device 650, is a general purpose or special purpose computing device comprising a processor, transient and persistent storage devices, input/output subsystem, bus to provide a communications path between components comprising the general purpose or special purpose computer, and a web-based client application, such as a web browser, which allows a user to access the data stored within the first data store 630 and the second data store 680 where potential relationships and derived scores or impact values are stored and maintained. Examples of web browsers are known in the art, such as Microsoft Internet Explorer, Google Chrome, Mozilla Firefox and Apple Safari.

FIG. 6 depicts an exemplary computer-based infrastructure 700 for linking documents that refer to other documents through implicit linkages. In one embodiment, as shown in the FIG. 7 example, the first data store 630 and the data sources 640, 642, 644 are connected to an information technology (IT) infrastructure 710. The IT infrastructure 710 comprises a data ingestion and processing module 712 where large volumes of data are extracted from meta-data 37, 47, 630, 640, 642, 644 and ingested for processing into various formats. The data is then further transmitted to the second data store 680 where the data is saved in a variety of formats, e.g. according to the Resource Description Framework (RDF), as indicated in the figure. The second data store 680 can be implemented as a SQL, NoSQL, Triplestore, or any other database. The data is further processed by a relationship identification module 720 in order to identify potential links between documents or sources. A relationship validation and filter module 722 helps to validate the identified implicit linkages. This task can be supported by semantic text analysis and a subsequent semantic text analysis module 724 to further refine the validation, identify additional signals, and help determine the strength of the signals. A score valuation module 726 considers various factors, like citation frequency, citation position, facets, quotations, and sentiment, in order to derive an impact value or score. A user can access the processed data via the user interface 656 on the access device 650 that can be a mobile device, a browser, a desktop device, or any kind of device for querying and representing data.

Figure 7:
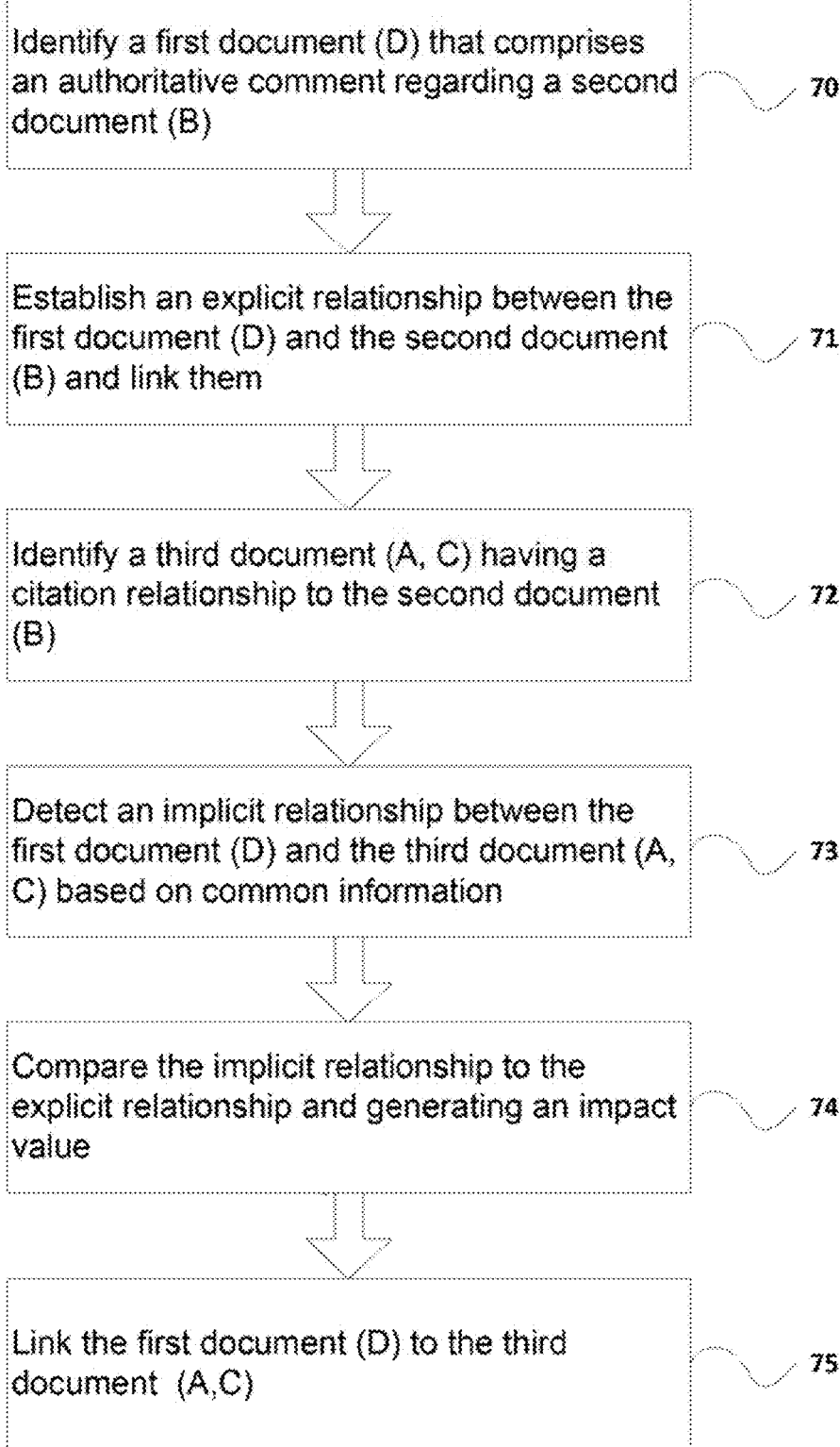
FIG. 7 is a flow diagram illustrating an exemplary computer-implemented method for linking documents that refer to other documents through implicit linkages.

FIG. 7 depicts a flow diagram illustrating an exemplary computer-implemented method for linking documents that refer to other documents through implicit linkages or relationships.

In step 70 a first document, such as Document 1 of FIG. 1, Case 31 of FIG. 3, and Study 41 of FIG. 4, is identified by using the server 610 that is connected through the network 660 to the respective data sources 38, 39, 48, 49, 630, 640, 642, 644 of FIGS. 3 and 4. This first document 1, 31, 41, also labeled with D, comprises an authoritative comment regarding a second document, such as the respective second documents 2, 32, 42 of FIGS. 1, 3 and 4, also labeled with B. An explicit relationship or linkage is established in step 71 between the first document (D) and the second document (B) by using common information, such as metadata stored and provided by the respective data sources 38, 39, 48, 49, 630, 640, 642, 644 of FIGS. 3 and 4. The common information can be derived through a comparison. Next, in step 72 one or more third documents, such as the respective third documents 3, 3', 33, 33', 33", 43, 43', 43" of FIGS. 1, 3 and 4, also labeled as A and C, respectively, are identified. The second document (B) cites or is being cited by the one ore more third documents (A, C) and shares common information. Steps 71 and 72 are performed by the server 610 in connection with the first data store 630 and the data ingestion and processing module 712 of the IT infrastructure 710. In step 73 an implicit relationship between the first document (D) and the one or more third documents (A, C) is detected by using the common information between the second document (B) and the third document (A, C) processed through the relationship identification module 720 and the relationship validation and filter module 722.

The implicit relationship can be used to create implicit links or linkages when documents are related by shared metadata. The metadata is created or can be derived based on source content, semantic analysis, sentiment analysis (positive/negative), proprietary taxonomical relationship, citation network analysis, or any other big data techniques known today or in the future.

Then, in step 74, through the semantic text analysis module 724 and the score valuation module 726, the implicit relationship is compared to the explicit relationship and in response to that an impact value is generated and stored. The impact value, also referred to as score value, is here derived from metadata and/or shared facets.

Following, in step 75 the first document (D) is linked to the third document (A, C) via the common information and the results are stored in the data store 680. The linkage(s) and the impact value(s) are available through the user interface 656 at the access device 650 to a user.

Further, it should be noted that the systems 600 and 700 shown in FIGS. 5 and 6 are only embodiments of the disclosure. Other system embodiments of the disclosure may include additional structures that are not shown, such as secondary systems, storage and additional computational devices. In addition, various other embodiments of the disclosure include fewer structures than those shown in FIG. 5 or 6. For example, in one embodiment, the disclosure is implemented on a single computing device in a non-networked standalone configuration. Data input and requests are communicated to the computing device via an input device, such as a keyboard and/or mouse. Data output, such as the computed score value, of the system is communicated from the computing device to a display device, such as a computer monitor.

FIGS. 1 through 7 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A computer-implemented method for linking documents that refer to other documents through implicit linkages, the method comprising:
   identifying a first document, the first document comprising an authoritative comment regarding a second document;
   establishing an explicit linkage between the first document and the second document based upon the authoritative comment;
   identifying one or more third documents based upon the existence of a citation relationship between the second document and each of the one or more third documents
   detecting an implicit relationship between the first document and the one or more third documents by using common information between the second document and the one or more third documents;
   generating an impact value for each of the one or more third documents by comparing the implicit relationship with the first document to the explicit relationship with the second document, the impact value being an indicator of the implicit relationship between the first document and each of the one or more third documents;
   linking the first document to the one or more third documents based upon the impact value; and
   presenting the one or more third documents in response to a query for the first document.

2. The computer-implemented method of claim 1, wherein the generation of the impact value is based on metadata and semantic text analysis.

3. The computer-implemented method of claim 1, wherein the impact value indicates a level of impact displayed to a user.

4. The computer-implemented method of claim 1, further comprising: using the impact value for indicating a reference between the first document and the one or more third documents.

5. The computer-implemented method of claim 1, wherein the impact value relates to a visual effect for displaying a reference between the first document and the one or more third documents.

6. The computer-implemented method of claim 1, further comprising: excluding a fourth document that cites the second document, the fourth document sharing different information other than the common information.

7. The computer-implemented method of claim 1, further comprising: identifying the first document in response to an event relating to one or more of a new publication, case release, journal retraction, and legislation.

8. The computer-implemented method of claim 1, further comprising: updating the linking when document changes occur.

9. The computer-implemented method of claim 1, further comprising: including in the linkage additional documents citing or being cited by the one or more third documents.

10. A computer-based system comprising processor, memory, and machine readable code stored in memory and executable by processor for linking documents that refer to other documents through implicit linkages, the system is configured to:
    identify a first document, the first document comprising an authoritative comment regarding a second document;
    establish an explicit linkage between the first document and the second document based upon the authoritative comment;
    identify one or more third documents, based upon the existence of a citation relationship between the second document and each of the one or more third documents;
    detect an implicit relationship between the first document and the one or more third documents by using common information between the second document and the one or more third documents;
    generate an impact value for each of the one or more third documents by comparing the implicit relationship with the first document to the explicit relationship with the second document, the impact value being an indicator of the implicit relationship between the first document and each of the one or more third documents;
    link the first document to the one or more third documents based upon the impact value; and
    present the one or more third documents in response to a query for the first document.

11. The system of claim 10, wherein the impact value is indicative to an implicit relationship between the first document and the one or more third documents and is displayed to a user.

12. The system of claim 10, wherein the system is updated when document changes occur.

13. Non-transitory computer readable media comprising program code stored thereon for execution by a programmable processor to perform a method for linking documents that refer to other documents through implicit linkages, the computer readable media comprising:

program code for identifying a first document, the first document comprising an authoritative comment regarding a second document;

program code for establishing an explicit linkage between the first document and the second document based upon the authoritative comment;

program code for identifying one or more third documents based upon the existence of a citation relationship between the second document and each of the one or more third documents;

program code for detecting an implicit relationship between the first document and the one or more third documents by using common information between the second document and the one or more third documents;

program code for generating an impact value for each of the one or more third documents by comparing the implicit relationship with the first document to the explicit relationship with the second document, the impact value being an indicator of the implicit relationship between the first document and each of the one or more third documents;

program code for linking the first document to the one or more third documents based upon the impact value; and program code for presenting the one or more third documents in response to a query for the first document.

\* \* \* \* \*